United States Patent [19]

Benz et al.

[11] Patent Number: 5,080,482
[45] Date of Patent: Jan. 14, 1992

[54] LENS ALIGNMENT AND POSITIONING METHOD AND APPARATUS

[75] Inventors: Patrick H. Benz; Andrew J. Eckles, IV; Peter B. Bumpus, all of Sarasota; Richard W. Adams, Myakka City; Stephen R. Grant, Sarasota, all of Fla.

[73] Assignee: Benz Research and Development Corporation, Sarasota, Fla.

[21] Appl. No.: 529,632

[22] Filed: May 29, 1990

[51] Int. Cl.$^5$ .............................................. G01B 11/27
[52] U.S. Cl. ................ 356/127; 51/101 LG; 356/153
[58] Field of Search ............ 356/124, 127, 153; 51/101 LG, 105 LG, 124 L, 165.71; 82/1.11; 364/474.06

[56] References Cited

U.S. PATENT DOCUMENTS 3,542,476 11/1970 Nord .................................. 356/124

FOREIGN PATENT DOCUMENTS 259365 12/1985 Japan ........................... 51/101 LG Primary Examiner—F. L. Evans
Attorney, Agent, or Firm—Marks Murase & White

[57] ABSTRACT

A method and apparatus for aligning and positioning a lens such that the optical and/or cylinder axis of the lens is precisely aligned with a fixture for the purpose of assembly or further mechanical operations such as machining and polishing. According to another aspect of the invention, the lens apex is precisely positioned a constant distance from a reference point. In order to implement the above, a method and apparatus is disclosed for optically aligning and positioning lenses using digitzed video imaging, an X-Y-Z micron stage and a microprocessor (or computer) capable of performing image analysis.

8 Claims, 3 Drawing Sheets

FIG. 1a
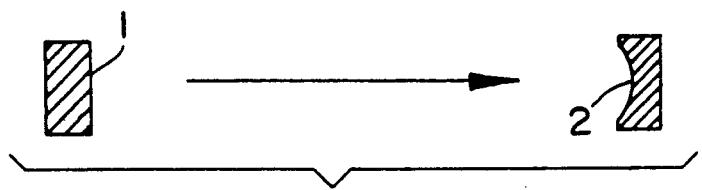
FIG. 1b
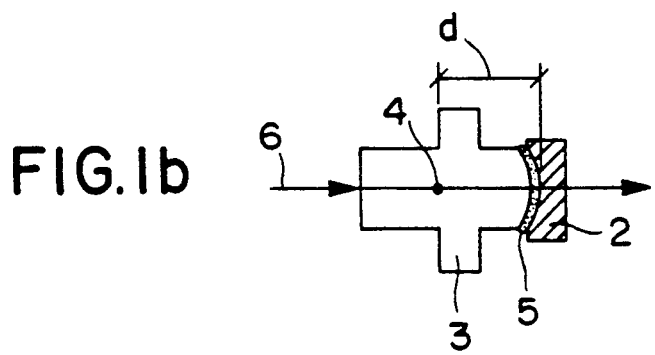
FIG. 1c
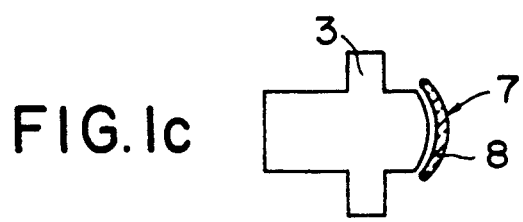
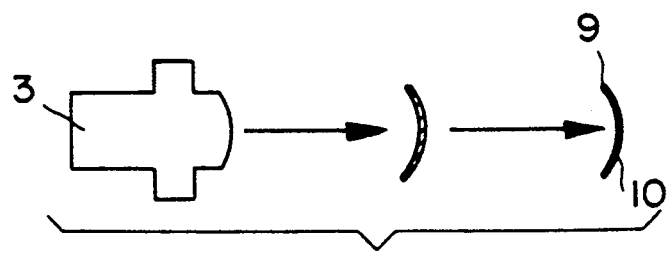
FIG. 1d

LENS ALIGNMENT AND POSITIONING METHOD AND APPARATUS

BACKGROUND OF THE INVENTION

1. Field of the Invention

This invention relates to a method and apparatus for aligning and positioning a workpiece, such as a lens, so that an axis of the workpiece is precisely aligned with a fixture and a surface of the workpiece is precisely positioned a constant distance from a reference point on the fixture. The invention has particular application in the field of manufacturing contact lenses.

2. Description of Prior Art

In the manufacture of lenses, the degree of accuracy of alignment of a partially finished lens to its fixture, e.g., a mandrel, determines the limit of concentricity possible through subsequent machining operations. A high degree of concentricity is advantageous in the manufacture of lenses since greater concentricity results in less prism. The accuracy of positioning the apex of the lens to a reference point or shoulder of the fixture determines the accuracy of the manufactured lens thickness. A high degree of consistency of lens thickness is advantageous for the manufacture of lenses.

An example of the use of this invention is in the manufacture of contact lenses. However, the invention is not so limited and the principles of the invention may be applied to the manufacture of other types of lenses or objects other than lenses. For purposes of example only, the process of manufacturing contact lenses will be described.

Contact lenses are typically manufactured by way of a complex multi-step operation whereby the fabricated lens goes through many precision operations. As shown in FIG. 1a, generally the first stage of manufacture forms a polished lens surface 2 on a "blank" 1 of plastic. The second stage (FIG. 1b) of manufacture transfers this optical lens surface to a block 3 whereby the polished surface is precisely fixed to a block 3 with a suitable material such as wax or cement 5 so that a second surface of the lens can be machined. This stage is commonly referred to as blocking a lens. The third stage (FIG. 1c) forms a polished optical surface 7 of a fixed diameter on the second surface of the lens 8 thereby forming a contact lens. The fourth stage (FIG. 1d) involves removing the finished lens and polishing the edges 9 of the lens 10 in a known manner.

In order to minimize prism and maximize concentricity of the manufactured lens, and to precisely control the thickness of the manufactured lens, it is important to precisely align an axis 6 of the lens, such as the optical axis, and to ensure that a portion of the lens, e.g., the apex, is precisely positioned a constant distance d from a reference point 4. However, such precise positioning can be time consuming and difficult to obtain if done manually.

While some attempts have been made to automate this process to some extent, the prior art falls short of achieving the results of the present invention.

SUMMARY OF THE INVENTION

In view of the foregoing, it is an object of the present invention to overcome the drawbacks of the prior art.

More specifically, it is an object of the present invention to provide an automatic manufacture process.

It is another object of the invention to provide automatic alignment and positioning of a workpiece.

It is another object of the invention to minimize prism in the manufacture of a lens.

It is another object of the invention to maximize concentricity in the manufacture of a lens.

It is another object of the invention to maximize control of the thickness of a manufactured lens.

It is a further object to provide greater precision in a manufacture process than is currently typical in the art.

The present invention offers several distinct advantages over the current methods used for blocking contact lenses. It provides greater accuracy than is typically achieved by present methods. Specifically, it provides greater accuracy of concentricity and position of the apex of the lens. Greater accuracy of concentricity means less prism in the manufactured lens. Greater accuracy of positioning of the apex means better control of the manufactured lens thickness.

Moreover, the present invention also utilizes technology and equipment that can be advantageously employed in a fully automated manufacturing process. The lens surface can be aligned, positioned, and blocked by computer control; no manual operations are required. This greatly reduces the cost of manufacture.

More specifically, the method of the present invention, when applied to the manufacture of contact lenses, involves the steps of placing a finished base curve surface in a fixture attached to the X-Y part of an X-Y-Z micron stage, obtaining a video image of a focusing reticle, digitizing the video image, moving the X-Y-Z micron stage, under computer control, mathematically analyzing the quality of focus to align the optical axis of the lens and the image, storing the corresponding X, Y position, determining the position of the Z-axis which produces the sharpest reticle image (the lens focal point) and storing information representing the determined Z-axis position in a storage device. These steps precisely align an axis of the lens with the optical axis of the video imaging device and focus the digitized reticle image of the lens focal point.

A block may then be inserted into holder which is attached to a microscope objective (alternatively, a fixed distance to the side as shown by the dotted lines in FIG. 2) and a fixing material (e.g., hot wax) is deposited onto the base curve surface. The computer controls the Z-axis down to a point above the lens which allows the apex of the lens to be fixed at the desired distance from the reference shoulder of the block, the critical distances having been previously stored in the computer. The holder in this example could be a vacuum chuck.

Once the wax cools, the computer moves the Z-axis away so that the base curve which is now fixed to its block can be removed and the process repeated for the next lens.

BRIEF DESCRIPTION OF THE DRAWINGS

FIGS. 1a–1d are diagrammatic representation of a blocking operation for a lens.

DESCRIPTION OF THE PREFERRED EMBODIMENT

Figure 2:
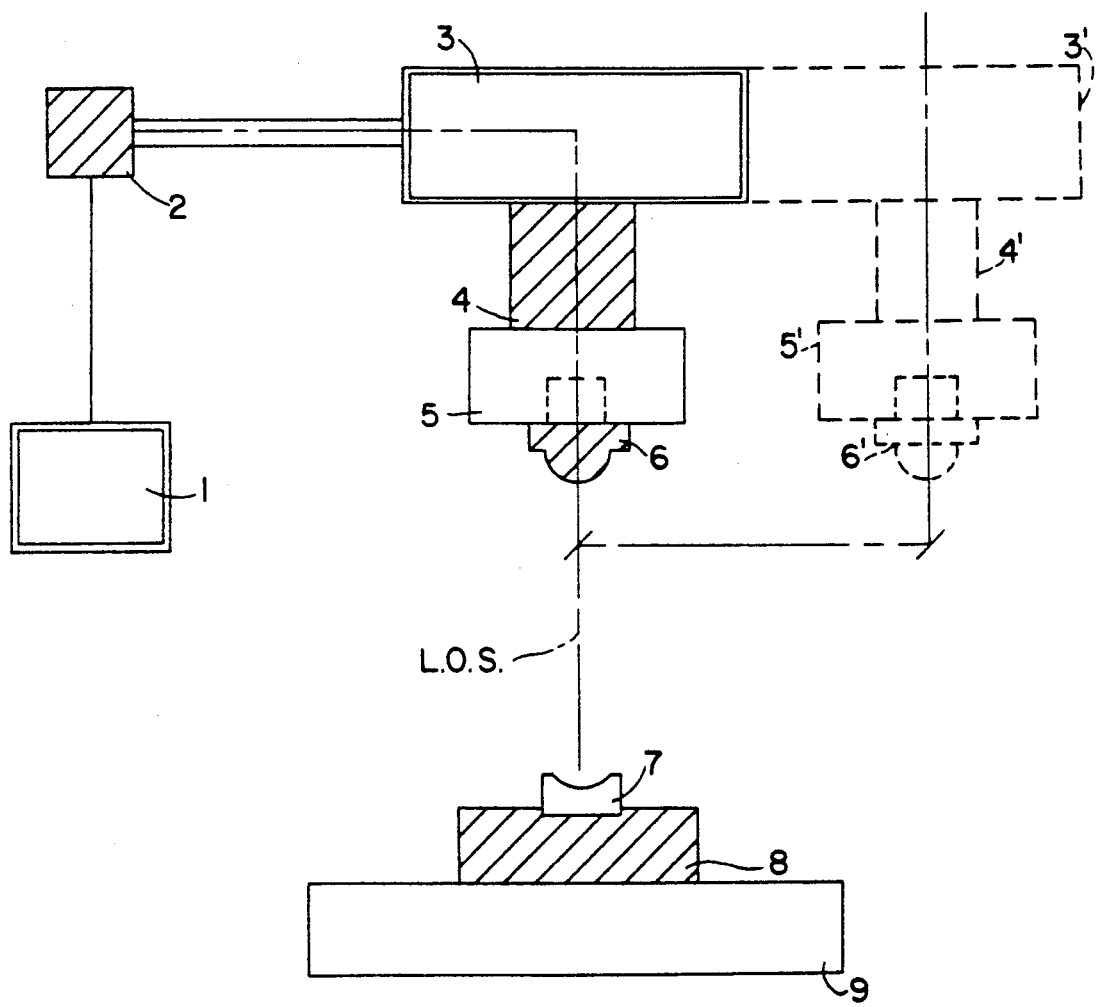
FIG. 2 is a diagrammatic representation of an apparatus capable of carrying out the present invention.

With reference to FIG. 2, there is shown an apparatus for implementing the steps of the present invention. Specifically, there is disclosed an alignment and positioning apparatus for aligning and positioning a workpiece in order to enable precise alignment to be performed automatically under computer control without the need for manual alignment.

In FIG. 2 there is shown a controller 1 such as a computer or microprocessor which has digital analysis capability and which can function to control movement of an X-Y-Z micron stage. The controller is calibrated to determine the X and Y distances corresponding to the width of one pixel. Z-axis movement is in small, arbitrary, but known, units from some reference point designated Z=0. There is also provided a CCD TV camera 2 or other camera-type apparatus for generating a visual image as will be discussed below. A Z-axis element of an X-Y-Z micron stage is indicated as element 3. The Z-axis further includes a microscope objective (preferably 2-20X) or other suitable lens structure 4, a chuck or other suitable holding structure 5 for holding a block 6, and a workpiece, such as a lens 7, attached to a fixture assembly 8. Fixture assembly 8 is operably connected to the X-Y axis of an X-Y-Z micron stage 9.

The chuck can be mounted in the optical axis or line of sight (LOS) of the workpiece whereby camera 2 views the workpiece through a hollow chuck, or the chuck can be mounted to the side a predetermined distance from the optical axis. This latter alternative is shown in dotted lines in FIG. 2.

According to a preferred embodiment of the present invention, camera 2 generates an image of a focusing reticle (not shown) located in the optical path between objective 4 and camera 2. This image is digitized, and digital analysis is performed to determine the position of best focus. According to the amount of speed and accuracy desired, which will vary from application to application, various digital analysis techniques may be used. As is well known, a digital image is comprised of a plurality of pixels where each pixel has a unique X and Y coordinate. For pixels all lying in an X-Y plane the Z coordinate will be the same for each pixel. Each pixel has an intensity level between 0 (black) and some value N (white) which may be for example 256. These values can also be referred to as gray levels. Often, a threshold value for the gray or intensity level may be predetermined such that any pixel having an intensity below the predetermined value will be assigned a binary value of 0 (black) and any pixel having an intensity level above the predetermined value is accorded a binary value of 1 (white), or vice versa.

In operation, a video image of a focusing reticle located in the optical path between the microscope objective and the video camera can be generated by camera 2 and digitized according to the above. Then, under control of computer 1, the components of the X-Y-Z micron stage are moved to align the image with the optical axis of the video camera and focus the digitized reticle image of the lens focal point.

This may be done by using a centering subroutine of a type commonly known. Briefly, information corresponding to the configuration of the reticle (e.g., size, shape, pattern, etc.) is pre-stored in the computer. When a reticle image is generated by reflection from the lens, back to the imaging device, the reticle image falls within the field of view of the imaging device. (If it does not, it can be brought into the field of view under computer control.) Under computer control, the X-Y stage is moved to locate the reticle image in the center of the field of view based on the previously stored reticle information. During initial setup, the center of the optical axis is made to correspond to the center of the field of view for the imaging device. Therefore, centering the reticle image causes the optical axis of the lens to be aligned with the optical axis of the imaging device. The (X,Y) position corresponding to this condition is stored in the computer.

Preferably, during initial setup, the optical axis of the holder 5 is aligned so that alignment of the lens axis with the imaging device also aligns it with the axis of holder 5.

Once the reticle image (lens focal point) is positioned in the center of the optical axis, the Z-axis position is adjusted under computer control to focus the reticle on the lens surface at its apex.

According to a preferred embodiment, to determine the degree of focus, a focusing algorithm is used which looks for transitions from light to dark either above or below the predetermined threshold value. Alternatively, it is desirable to use a focusing algorithm which looks for a change in intensity over a given range of pixels. Two techniques currently used to decrease analysis time are averaging values of groups of pixels with a position value consistent with their location, or, analyzing every nth pixel (where n is some number greater than or equal to 1). The best focus for one light to dark transition is the Z-position which gives the steepest slope in gray level difference moving a predetermined direction in the X-Y plane. The best focus overall is the Z-position with the highest average slope for one or more of the light to dark transitions scanned. Using one or more of the above processes, the computer determines the position on the Z-axis which produces the sharpest reticle image (the lens focal point). The Z-axis position corresponding thereto is then stored in memory associated with the computer 1.

According to the above, the centering determines the exact optical center line of the lens. The surface focus determines the exact position of the apex of the lens. After these positions are determined and information corresponding to the respective positions is stored in the computer memory, the block may be inserted into chuck 5 which is attached to the microscope of objective 4 and hot wax is deposited onto the base curve surface. The computer then moves the Z-axis down to a point above the lens which allows the apex to be fixed at the desired distance from the reference position, based on the information stored in the computer. Once any desired operations have been performed, the computer moves the Z-axis away so that the base curve which is now fixed to the block can be removed and the process repeated for the next lens.

Figure 3:
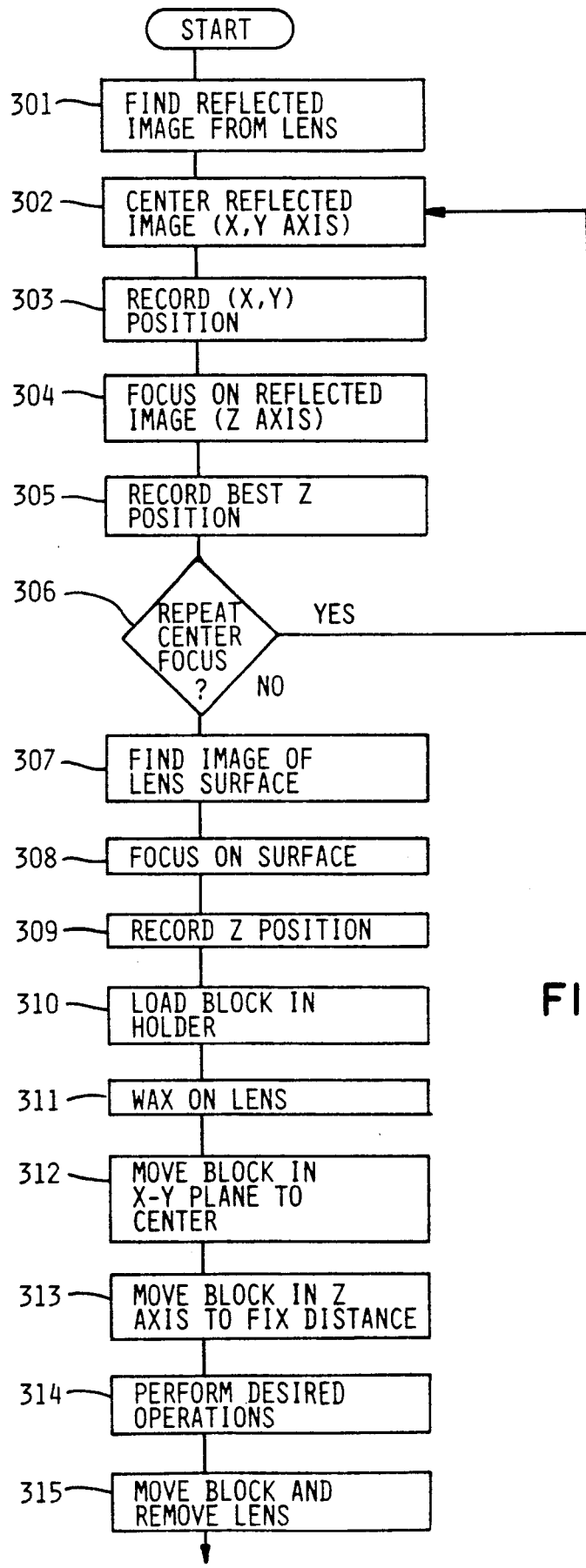
FIG. 3 is a flow chart illustrating the steps for carrying out a preferred embodiment of the present invention.

With reference to FIG. 3 there is shown a flow chart illustrating the operation of the present invention. After the lens is inserted into a holder connected to the X-Y part of the X-Y-Z micron stage, the reflected image from the lens is found (301). This is done by movement of the Z-axis to bring the reflected image of a reticle or light source into focus somewhere in the field of view. X and Y axis movements are then made, if necessary, to bring the reflected image into the field of view. Next, the reflected image (or a portion of it) is centered in the current field of view by computer controlled manipulation of the X-Y stages of the X-Y-Z micron stage (302). When the reflected image is centered, the position (X,Y) corresponding to this position is stored in a memory associated with a computer (303). Next, the centered image is focused upon by computer controlled manipulation of the Z-axis stage of the X-Y-Z micron stage (304). Once the position of best focus of the reflected image is determined, information corresponding to this position is stored in a memory associated with the computer (305). Then a determination is made as to whether to repeat the centering operation or not (306). This determination can be made based on a degree of quality and accuracy desired and considering the speed with which it is desired to perform the manufacture process. If the entire reflected image is not in the field of view or if increased accuracy is desired, multiple centering and focusing operations may be desirable. If it is desired to repeat the center focus process, control signal is generated by the computer which causes step 302 to be repeated. If it is not desired to repeat the center focus, control passes to step 307 where the image of the lens surface is found. Then, a focusing operation is performed on the surface of the lens (308). Information corresponding to the position of best focus of the surface of the lens is recorded in a memory associated with the computer (309). Then a block is loaded into a precision holder (310), wax is placed on the back surface of the lens so that the lens can be mounted to the block (311) and based on the stored information, computer controlled movement causes alignment of the center of the block with the optical axis of the lens (312). Then the block is moved in the Z-axis based on the stored Z information to achieve the exact offset (spacing or distance) with respect to a reference point (313). At this point, the lens is in proper position to perform additional machining operations or other desired operations (314). After any desired operations are performed, the block (fixture) and lens can be removed (315). This process can then be repeated for the next lens.

The present invention is not limited to us in manufacturing lenses. It will be readily apparent that the present invention can also be used for the precise alignment of other devices including laser sighting devices, gunsights, telescopes, etc., by using different algorithms and analysis techniques to analyze images transmitted through reflected lenses or by mirrors and convex lenses. The invention is only limited by the claims appended hereto.

I claim:

1. A method for positioning a lens having at least one axis and an apex, comprising the steps of:
   automatically aligning an optical axis of said lens with an axis of an imaging device; and
   automatically positioning the apex of said lens a predetermined distance from a reference point of a fixture capable of holding said lens.

2. A method of positioning a lens comprising the steps of:
   determining an axial position of said lens;
   storing first information corresponding to said determined axial position;
   determining the position of the apex of said lens;
   storing second information corresponding to the apex position; and
   using the first and second stored information to automatically operatively position said lens with respect to a holder such that the axis of said lens is in optical alignment with said holder and said apex is located a predetermined distance from a reference point.

3. The method of claim 2 wherein the step of determining an axial position of said lens comprises the steps of:
   locating a lens in a fixture attached to a portion of a movable support;
   generating a video image of a focusing reticle;
   digitizing said video image;
   controlling said movable support to move said lens within a field of view of an imaging device; and
   determining the position of said movable support which causes the video image to be located in the center of the field of view of the imaging device to thereby align the optical axis of said lens with an optical axis of said imaging device.

4. The method of claim 2, wherein the step of determining the position of the apex of said lens comprises the steps of:
   generating a video image of a focusing reticle;
   moving the focusing reticle through a plurality of positions within a field of view of an imaging device;
   analyzing the video image of said focusing reticle at said plurality of positions; and
   determining the position corresponding to where the focusing reticle is focused on the lens apex.

5. A positioning apparatus for positioning a lens comprising:
   holder means capable of holding said lens;
   means for automatically aligning an axis of said lens with an axis of said holder means; and
   means for automatically positioning the apex of said lens a predetermined distance from a reference point.

6. A positioning apparatus for positioning a lens comprising:
   first determining means for determining an axial position of said lens;
   first storage means for storing information corresponding to said determined axial position;
   second determining means for determining the position of the apex of said lens;
   second storage means for storing information corresponding to the apex position; and
   control means responsive to said stored information for automatically controlling the relative position of said lens with respect to a holder such that the axis of said lens is in optical alignment with said holder and the apex of said lens is located a predetermined distance from a reference point.

7. The apparatus of claim 6 wherein said first determining means comprises:
   image means, having a field of view, for generating a video image representing the position of the axis of said lens;
   control means for causing movement of said lens within the field of view of said image means to center the video image within the field of view of said image means.

8. The apparatus of claim 6 wherein the second determining means comprises:
   means for generating a video image representing the quality of focus of a focusing means with respect to the apex of said lens;
   control means for relatively moving the position of said focusing means with respect to said lens;
   means for analyzing the quality of focus of said video image during said relative movement at a plurality of positions; and
   means for determining the relative position of said focusing means and lens corresponding to the best focus of said video image.

* * * * *